(12) United States Patent
Rakshit

(10) Patent No.: US 9,396,191 B2
(45) Date of Patent: *Jul. 19, 2016

(54) VIDEO DATA FILTERING

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 323 days.

This patent is subject to a terminal disclaimer.

(21) Appl. No.: 14/225,528

(22) Filed: Mar. 26, 2014

(65) Prior Publication Data

US 2014/0207804 A1    Jul. 24, 2014

Related U.S. Application Data

(63) Continuation of application No. 12/984,744, filed on Jan. 5, 2011, now Pat. No. 8,694,667.

(51) Int. Cl.
*G06F 15/16* (2006.01)
*H04L 29/06* (2006.01)
*H04N 21/258* (2011.01)
*G06F 17/30* (2006.01)
*H04N 21/431* (2011.01)
*H04N 21/45* (2011.01)
(Continued)

(52) U.S. Cl.
CPC .... *G06F 17/30017* (2013.01); *H04L 29/06027* (2013.01); *H04N 21/25891* (2013.01); *H04N 21/4318* (2013.01); *H04N 21/454* (2013.01); *H04N 21/4532* (2013.01); *H04N 21/4542* (2013.01); *H04N 21/4545* (2013.01); *H04N 21/45452* (2013.01); *H04N 21/4755* (2013.01)

(58) Field of Classification Search
CPC combination set(s) only.
See application file for complete search history.

(56) References Cited

U.S. PATENT DOCUMENTS 5,136,655 A    8/1992    Bronson
6,519,770 B2   2/2003    Ford
(Continued)

FOREIGN PATENT DOCUMENTS

WO    2006113742    10/2006

OTHER PUBLICATIONS

Boyle et al., The Effects of Filtered Video on Awareness and Privacy, 10 pages.
(Continued)

*Primary Examiner* — Saket K Daftuar
(74) *Attorney, Agent, or Firm* — Schmeiser, Olsen & Watts; John Pivnichny

(57) ABSTRACT

A filtering method and system. The method includes receiving by a computer processor an audio/video data file and filtering data. The computer processor analyzes the filtering data with respect to the audio/video data file and retrieves specified audio/video data portions comprising data objects within frames of the audio/video data file. The computer processor removes gaps existing in the audio/video data file and receives tags comprising instructions for presenting video data of the audio/video data file, audio data of the audio/video data file, and the specified audio/video data portions. The computer processor stores the video data in a first layer of a multimedia file, the audio data in a second layer of the multimedia file, and the specified audio/video data portions in additional layers of the multimedia file. Each of the first layer, the second layer, and the additional layers comprises a tag layer comprising the tags.

20 Claims, 8 Drawing Sheets

(51) Int. Cl.
*H04N 21/454* (2011.01)
*H04N 21/4545* (2011.01)
*H04N 21/475* (2011.01)

(56) References Cited

U.S. PATENT DOCUMENTS

| | | |
|---|---|---|
| 6,925,499 B1 | 8/2005 | Chen et al. |
| 7,136,883 B2 | 11/2006 | Flamma et al. |
| 7,162,526 B2 | 1/2007 | Dutta et al. |
| 7,540,009 B1 | 5/2009 | Bryant et al. |
| 7,714,878 B2 | 5/2010 | Gabay et al. |
| 8,271,506 B2 | 9/2012 | Martinez et al. |
| 8,694,667 B2 | 4/2014 | Rakshit |
| 2003/0192044 A1 | 10/2003 | Huntsman |
| 2004/0006767 A1 | 1/2004 | Robson et al. |
| 2004/0205093 A1 | 10/2004 | Li et al. |
| 2005/0257242 A1 | 11/2005 | Montgomery et al. |
| 2007/0011210 A1 | 1/2007 | Flamma et al. |
| 2007/0168853 A1 | 7/2007 | Jarman |
| 2007/0186235 A1 | 8/2007 | Jarman et al. |
| 2008/0098313 A1 | 4/2008 | Pollack |
| 2008/0141317 A1 | 6/2008 | Radloff et al. |
| 2008/0250458 A1 | 10/2008 | Roman |
| 2009/0313546 A1 | 12/2009 | Katpelly et al. |
| 2010/0111360 A1 | 5/2010 | Sigal |
| 2010/0185502 A1 | 7/2010 | Roberts et al. |
| 2011/0107379 A1 | 5/2011 | Lajoie et al. |
| 2011/0119637 A1 | 5/2011 | Tuli et al. |
| 2012/0117103 A1 | 5/2012 | Farrelly et al. |
| 2012/0173750 A1 | 7/2012 | Rakshit |

OTHER PUBLICATIONS

Office Action (Mail Date Jun. 27, 2013) for U.S. Appl. No. 12/984,744, filed Jan. 5, 2011; Confirmation No. 2924.
Amendment filed Sep. 23, 2013 in response to Office Action (Mail Date Jun. 27, 2013) for U.S. Appl. No. 12/984,744, filed Jan. 5, 2011; Confirmation No. 2924.
Notice of Allowance (Mail Date Nov. 25, 2013) for U.S. Appl. No. 12/984,744, filed Jan. 5, 2011; Confirmation No. 2924.

VIDEO DATA FILTERING

This application is a continuation application claiming priority to Ser. No. 12/984,744 filed Jan. 5, 2011.

FIELD

The present invention relates to a method and associated system for filtering audio/video data files.

BACKGROUND

Removing information from data typically comprises an inefficient process with little flexibility. Accordingly, there exists a need in the art to overcome the deficiencies and limitations described herein above.

SUMMARY

The present invention provides a method comprising: receiving, by a computer processor of a computing system, an audio/video data file comprising audio data and video data; receiving, by the computer processor, filtering data associated with filtering the audio/video data file; first analyzing, by the computer processor, the filtering data with respect to the audio/video data file; determining, by the computer processor based on results of the first analyzing, specified audio/video data portions of the audio/video data file, wherein the specified audio/video data portions comprise data objects within frames of the audio/video data file; retrieving, by the computer processor from the audio/video data file in response to the determining, the specified audio/video data portions from the audio/video data file; removing, by the computer processor, gaps existing in the audio/video data file resulting from the retrieving the specified audio/video data portions; receiving, by the computer processor, tags comprising instructions for presenting video data of the audio/video data file, audio data of the audio/video data file, and the specified audio/video data portions; storing, by the computer processor, the video data of the audio/video data file in a first layer of a multimedia file, the audio data of the audio/video data file in a second layer of the multimedia file, and the specified audio/video data portions in additional layers of the multimedia file, wherein each of the first layer, the second layer, and the additional layers comprises a tag layer comprising the tags; and storing, by the computer processor in a memory device, the multimedia file comprising the video data, the audio data, the tags, and the specified data portions.

The present invention provides a computer program product, comprising a computer readable storage medium having a computer readable program code embodied therein, the computer readable program code comprising an algorithm that when executed by a computer processor of a computing system implements a method comprising: receiving, by the computer processor, an audio/video data file comprising audio data and video data; receiving, by the computer processor, filtering data associated with filtering the audio/video data file; first analyzing, by the computer processor, the filtering data with respect to the audio/video data file; determining, by the computer processor based on results of the first analyzing, specified audio/video data portions of the audio/video data file, wherein the specified audio/video data portions comprise data objects within frames of the audio/video data file; retrieving, by the computer processor from the audio/video data file in response to the determining, the specified audio/video data portions from the audio/video data file; removing, by the computer processor, gaps existing in the audio/video data file resulting from the retrieving the specified audio/video data portions; receiving, by the computer processor, tags comprising instructions for presenting video data of the audio/video data file, audio data of the audio/video data file, and the specified audio/video data portions; storing, by the computer processor, the video data of the audio/video data file in a first layer of a multimedia file, the audio data of the audio/video data file in a second layer of the multimedia file, and the specified audio/video data portions in additional layers of the multimedia file, wherein each of the first layer, the second layer, and the additional layers comprises a tag layer comprising the tags; and storing, by the computer processor in a memory device, the multimedia file comprising the video data, the audio data, the tags, and the specified data portions.

The present invention provides a computing system comprising a computer processor coupled to a computer-readable memory unit, the memory unit comprising instructions that when executed by the computer processor implements a method comprising: receiving, by the computer processor, an audio/video data file comprising audio data and video data; receiving, by the computer processor, filtering data associated with filtering the audio/video data file; first analyzing, by the computer processor, the filtering data with respect to the audio/video data file; determining, by the computer processor based on results of the first analyzing, specified audio/video data portions of the audio/video data file, wherein the specified audio/video data portions comprise data objects within frames of the audio/video data file; retrieving, by the computer processor from the audio/video data file in response to the determining, the specified audio/video data portions from the audio/video data file; removing, by the computer processor, gaps existing in the audio/video data file resulting from the retrieving the specified audio/video data portions; receiving, by the computer processor, tags comprising instructions for presenting video data of the audio/video data file, audio data of the audio/video data file, and the specified audio/video data portions; storing, by the computer processor, the video data of the audio/video data file in a first layer of a multimedia file, the audio data of the audio/video data file in a second layer of the multimedia file, and the specified audio/video data portions in additional layers of the multimedia file, wherein each of the first layer, the second layer, and the additional layers comprises a tag layer comprising the tags; and storing, by the computer processor in a memory device, the multimedia file comprising the video data, the audio data, the tags, and the specified data portions.

The present invention advantageously provides a simple method and associated system capable of removing information from data.

DETAILED DESCRIPTION

Figure 1:
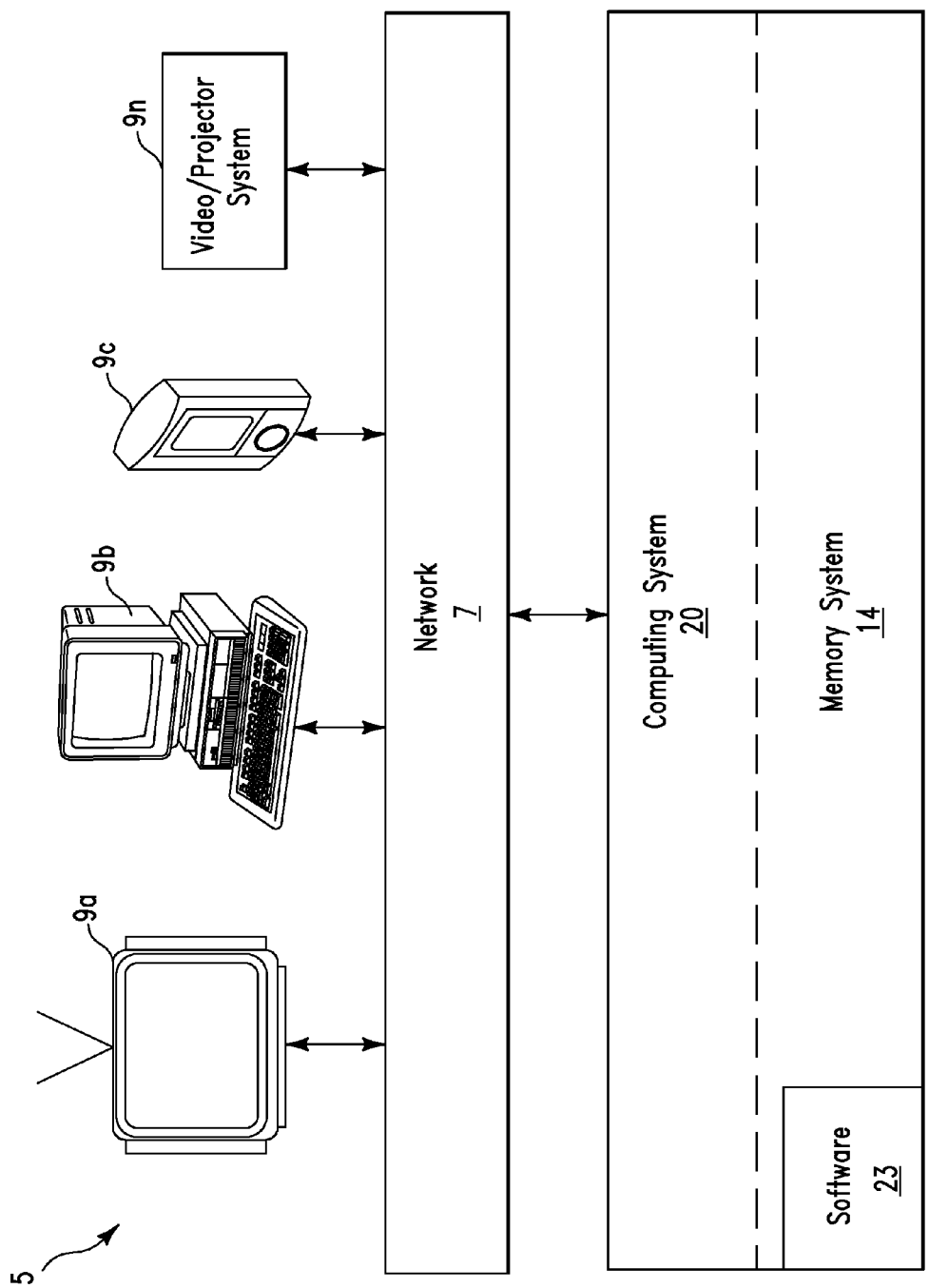
FIG. 1 illustrates a system for filtering audio/video objects from an audio/video frame, in accordance with embodiments of the present invention.

FIG. 1 illustrates a system 5 for filtering audio/video objects from an audio/video frame, in accordance with embodiments of the present invention. System 5 enables a user to specify that an audio/video object(s) (e.g., a portion of a picture, specific text, a specific potion of audio data, etc) should be removed (e.g., the audio/video object includes confidential information) from an audio/video frame of an audio/video data file. The audio/video object(s) specified for removal are stored in different individual layers of a multimedia file. Every layer of the multimedia file layer includes a dedicated tag layer comprising a defined tag (i.e., defined by a video editor) for the layer. Specified parameters are used for creating the audio/video content filter rules for filtering audio/video objects from an audio/video frame. The specified parameters may include, inter alia, a location of an audio/video display for broadcasting the audio/video data file, a profile of a viewer of the audio/video data file (e.g., the profile may include, inter alia, an age of the viewer, a designation of the viewer, a department of the viewer, etc), etc. Therefore, when a viewer accesses the audio/video data (e.g., via a television, online portal, PDA, cellular telephone, etc) a rule will be validated and based on the rule a specified audio/video object will be removed from a specified audio/video frame.

System 5 of FIG. 1 comprises devices 9a . . . 9n connected through a network 7 to a computing system 20. Alternatively, devices 9a . . . 9n may be directly connected to computing system 20 (i.e., without network 7). Devices 9a . . . 9n comprise any type of audio/video playback/broadcasting device such as, inter alia, a computer, a PDA, a laptop computer, a tablet computer, a cellular telephone, a television, an audio/video projector system, etc. Network 7 may comprise any type of network including, inter alia, a telephone network, a local area network, (LAN), a wide area network (WAN), the Internet, a wireless network, etc. Computing system 20 may comprise any type of computing system(s) including, inter alia, a computer (PC), a server computer, a database computer, a controller, etc. Computing system 20 comprises a memory system 14. Memory system 14 may comprise a single memory system. Alternatively, memory system 14 may comprise a plurality of memory systems. Memory system 14 comprises a software application 18 for filtering audio/video objects from an audio/video frame.

Figure 2:
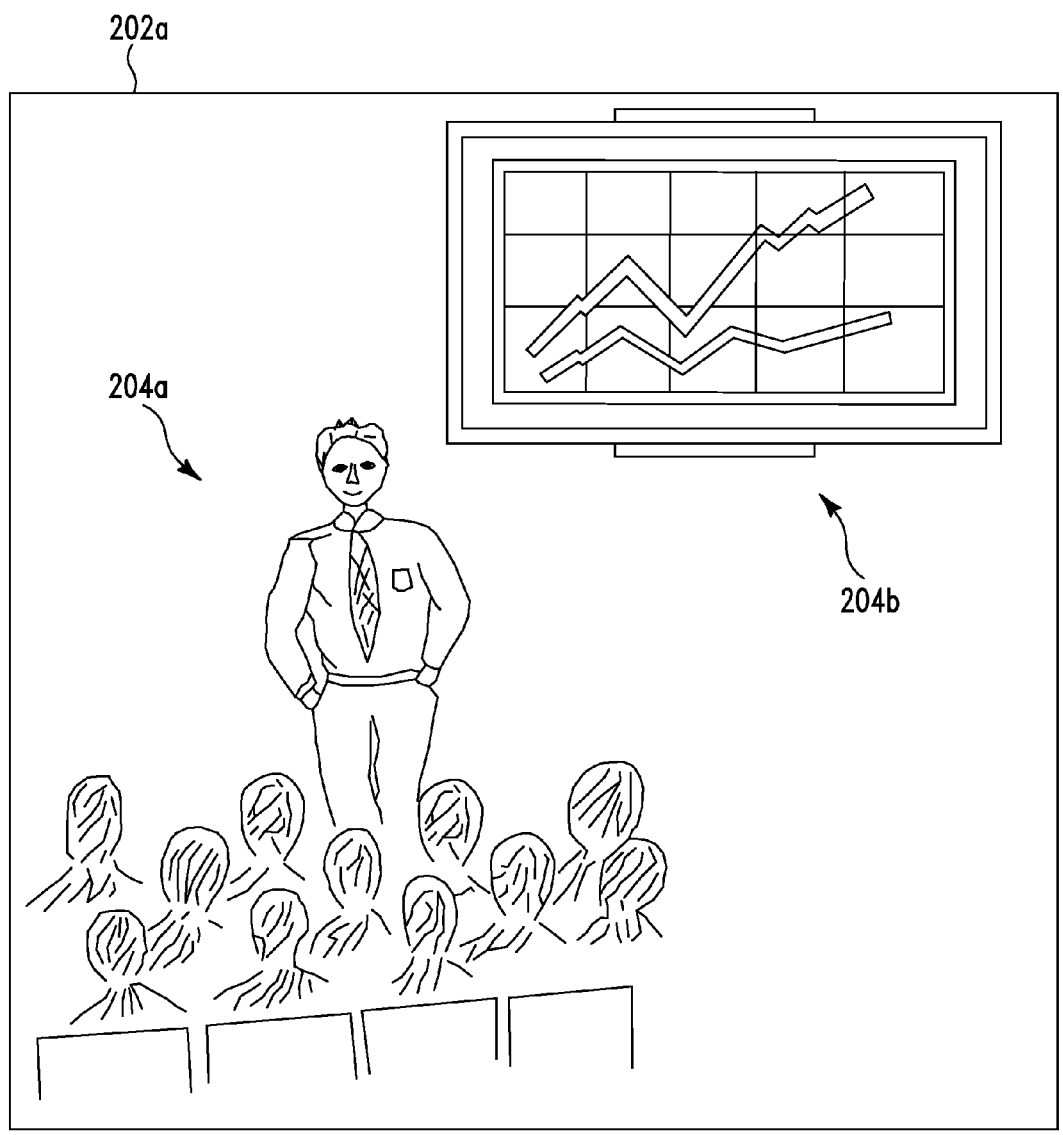
FIG. 2 illustrates a video frame comprising multiple video objects, in accordance with embodiments of the present invention.

FIG. 2 illustrates a video frame 202a comprising video objects 204a and 204b, in accordance with embodiments of the present invention. Video frame 202a is comprised by an audio/video data file. In FIG. 2A, video object 204b is determined to be confidential or inappropriate to specified viewers based on location based filtering criteria, age appropriateness, a confidential content of video object 204b.

Figure 3:
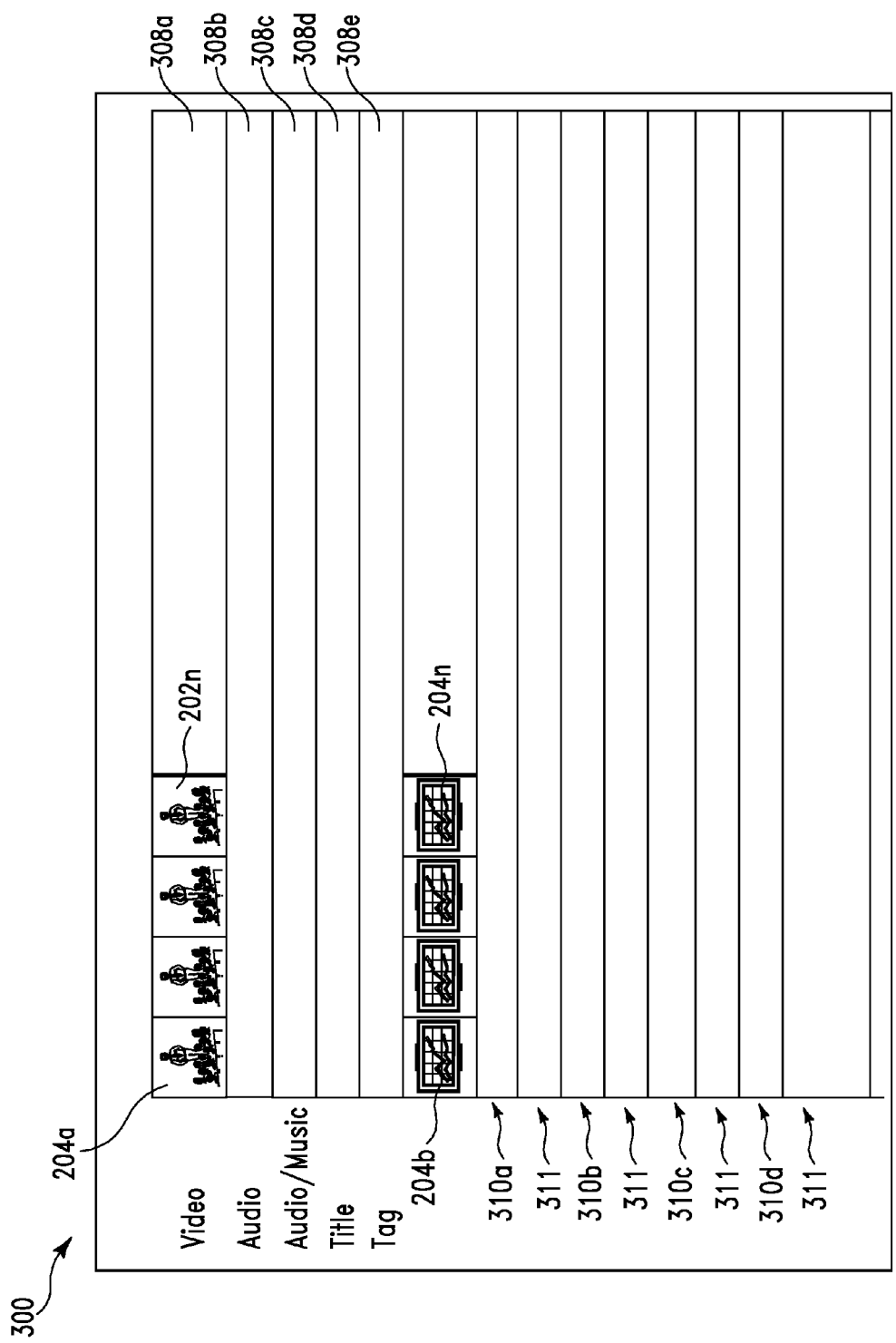
FIG. 3 illustrates a graphical user interface for removing a video object from video frame, in accordance with embodiments of the present invention.

FIG. 3 illustrates a graphical user interface (GUI) 300 for removing a video object 204b (and sequential video objects 204n from sequential video frames 202n) from video frame 202a (and sequential video frames), in accordance with embodiments of the present invention. Graphical user interface (GUI) 300 is implemented using system 5 of FIG. 1. Graphical user interface (GUI) 300 illustrates multiple layers of a multimedia file that includes the audio/video data file. The multimedia file includes a video layer 308a for storing video data, an audio layer 308b for storing audio (voice) data, an audio music layer 308c for storing audio music data, a title layer 308d for storing title related data, and a tag layer 308e for storing tags associated with each of layers 308a . . . 308d. Additionally, the multimedia file includes supplementary video layers 310a . . . 310d each comprising a dedicated tag layer 311. An editor (e.g., software application 23 of FIG. 1) will define each tag in each of tag layers 310a . . . 310d based on a video content appropriateness. Therefore, each tag specifies video objects for removal from video frames.

Figure 4:
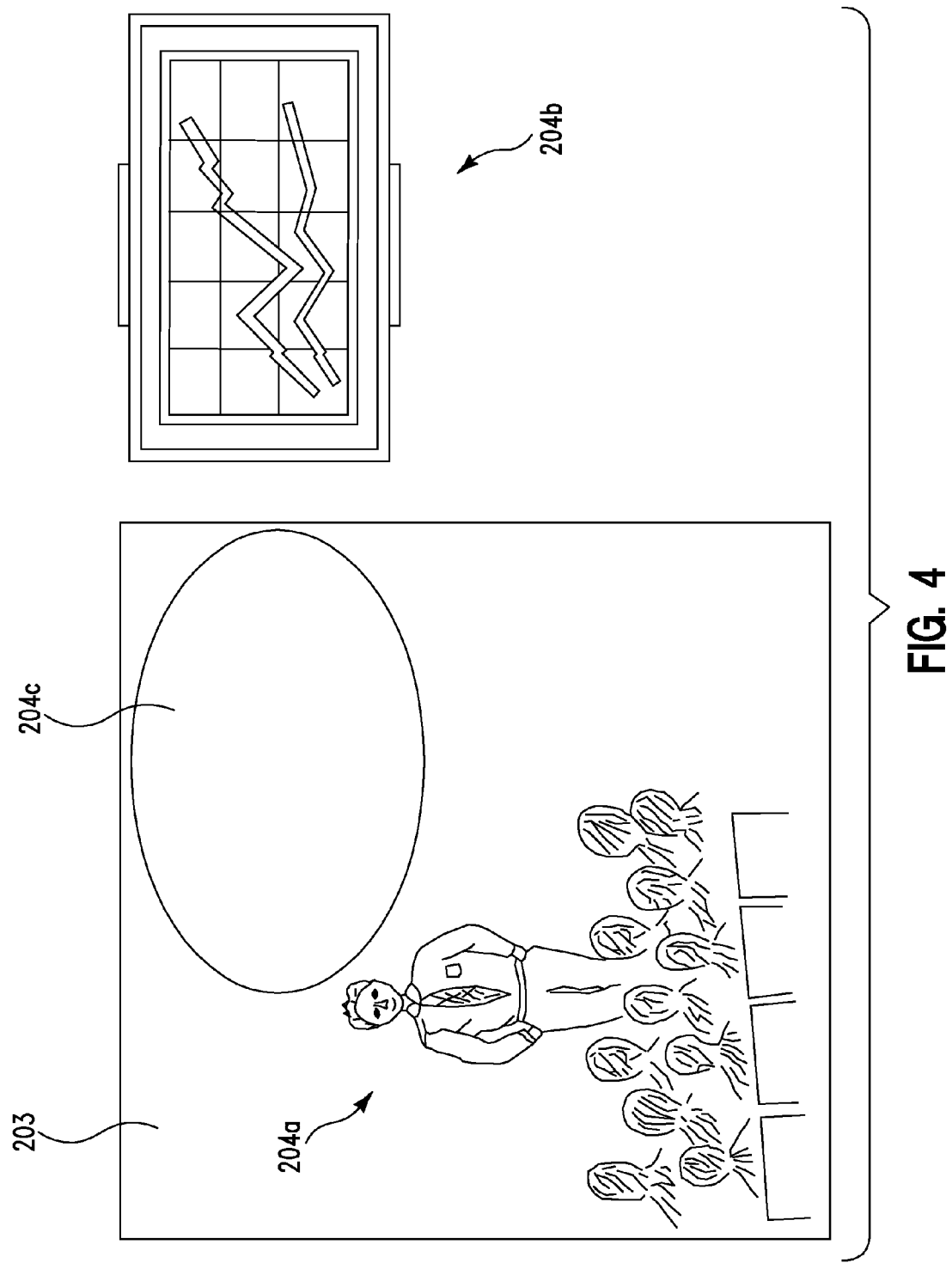
FIG. 4 illustrates a video frame comprising a video object and a gap section, in accordance with embodiments of the present invention.

FIG. 4 illustrates a video frame 203 comprising video object 204a and a gap section 204c, in accordance with embodiments of the present invention. Video frame 203 illustrates video frame 202a of FIG. 2 after video object 204b has been removed thereby leaving a gap 204c (or blank spot) in video frame 203. The gap 204c requires removal as illustrated in FIG. 5, infra.

Figure 5:
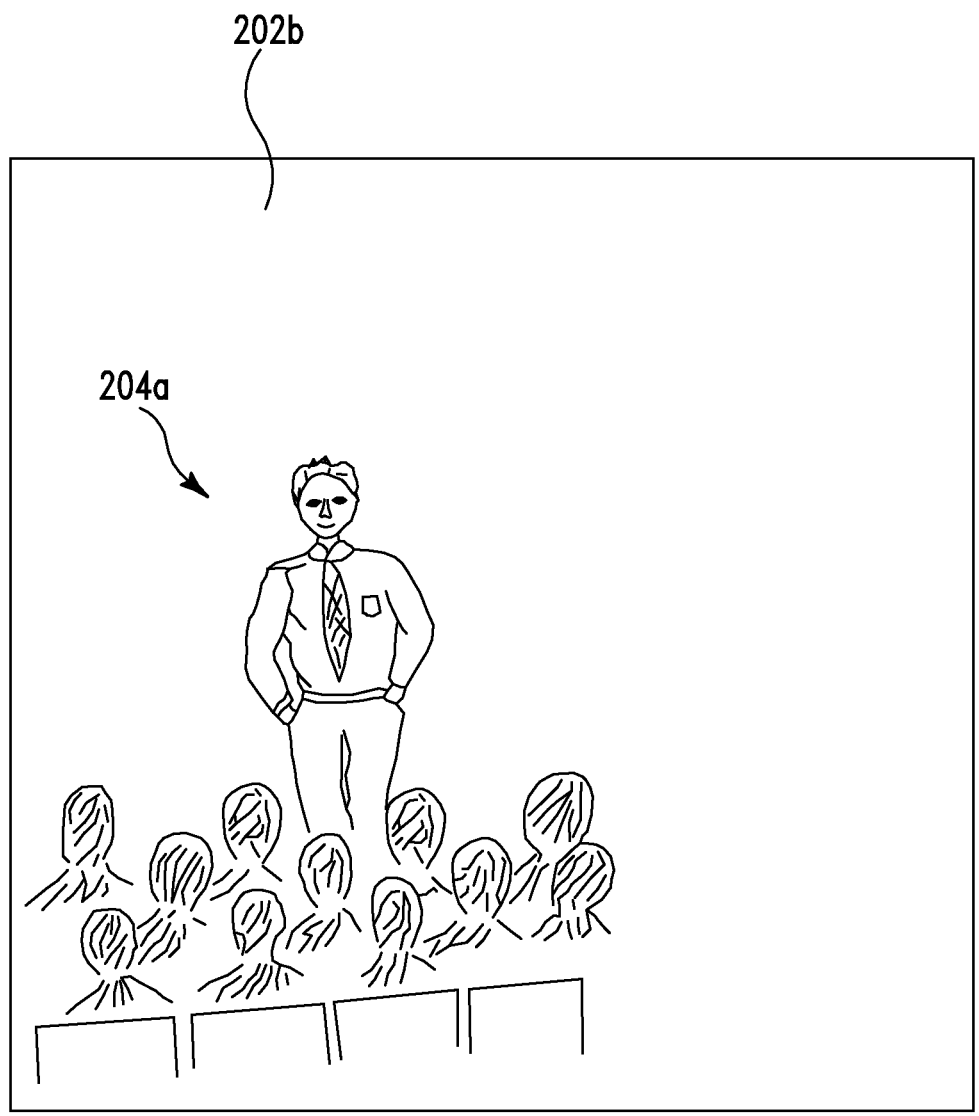
FIG. 5 illustrates a video frame comprising a video object, in accordance with embodiments of the present invention.

FIG. 5 illustrates a video frame 202b comprising video object 204a, in accordance with embodiments of the present invention. Video frame 202b illustrates video frame 203 of FIG. 4 after gap 204c has been removed.

Figure 6:
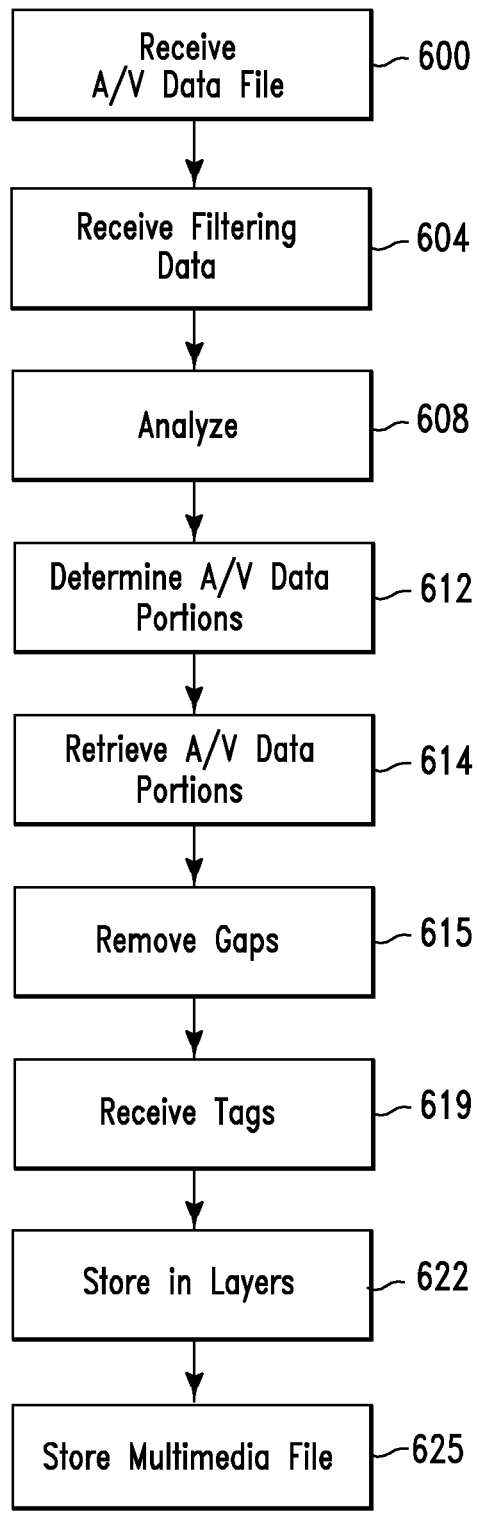
FIG. 6 illustrates an algorithm used by the system of FIG. 1 for implementing a process for removing audio/video objects from an audio/video frame, in accordance with embodiments of the present invention.

FIG. 6 illustrates an algorithm used by system 5 of FIG. 1 for implementing a process for removing audio/video objects from an audio/video frame, in accordance with embodiments of the present invention. In step 600, a computer processor (i.e., of a computing system such as, inter alia, computing system 10 of FIG. 1) receives an audio/video data file comprising audio data and video data (e.g., a movie, a TV show, a video presentation, etc). In step 604, the computer processor receives filtering data associated with filtering (e.g., removing specified audio/video data objects) the audio/video data file. In step 608, the computer processor analyzes the filtering data with respect to the audio/video data file. In step 612, the computer processor determines (i.e., based on results of step 608) specified audio/video data portions (i.e., for removal and placement in layers of a multimedia file) of the audio/video data file. The specified audio/video data portions comprise data objects within frames of the audio/video data file. In step 614, computer processor retrieves (i.e., from the audio/video data file in response to step 612) the specified audio/video data portions from the audio/video data file. In step 615, computer processor removes gaps existing in the audio/video data file resulting from retrieving said specified audio/video data portions in step 614. In step 619, the computer processor receives tags comprising instructions for presenting video data of the audio/video data file, audio data of the audio/video data file, and the specified audio/video data portions. In step 622, the computer processor stores the video data in a first layer of a multimedia file, the audio data in a second layer of said multimedia file, and the specified audio/video data portions in additional layers of the multimedia file. Each of said first layer, the second layer, and the additional layers comprises a tag layer comprising the tags. In step 625, the computer processor stores (in a memory system such as memory system 14 of FIG. 1) the multimedia file comprising the video data, the audio data, the tags, and the specified data portions.

Figure 7:
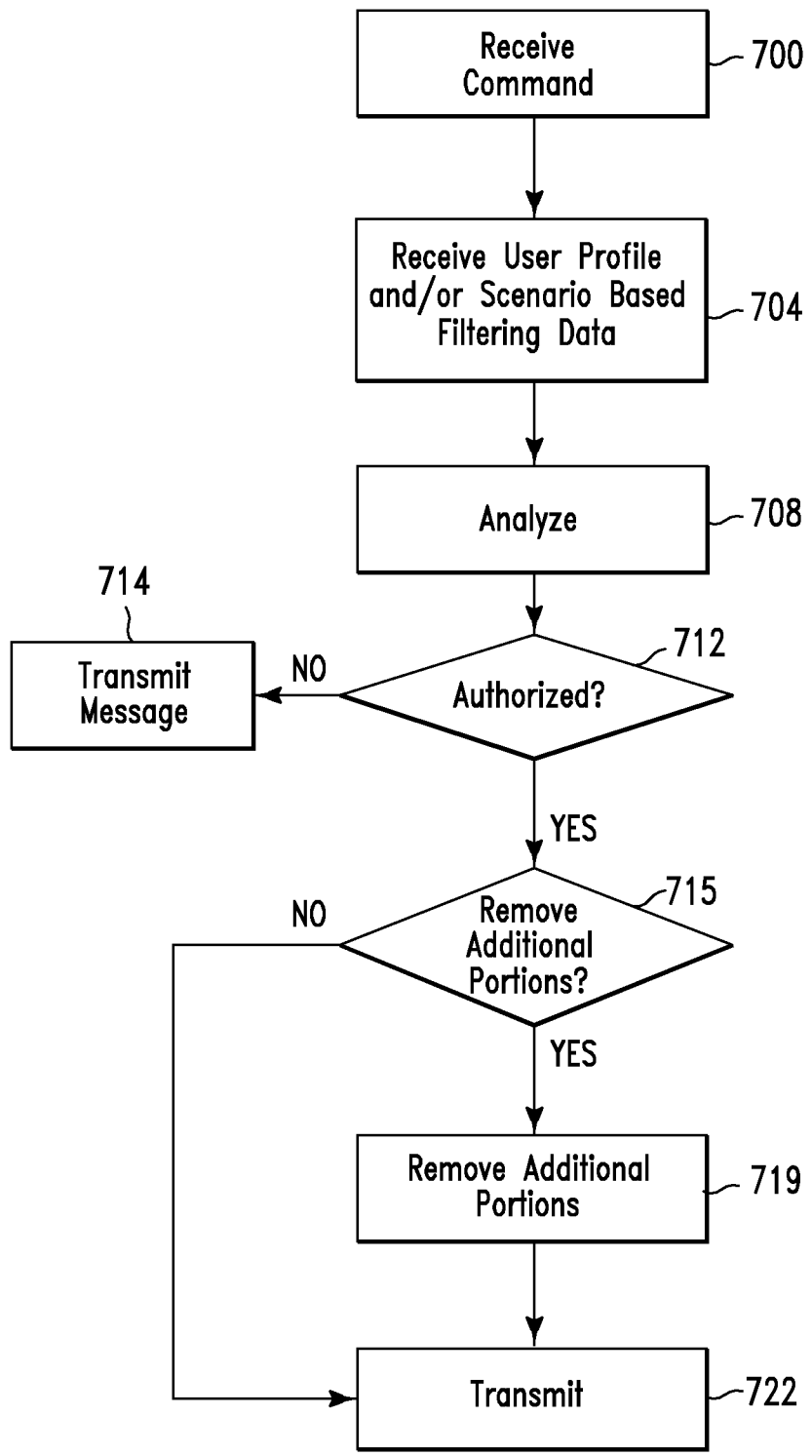
FIG. 7 illustrates an algorithm used by the system of FIG. 1 for implementing a process for presenting an audio/video data file generated by the algorithm of FIG. 6, in accordance with embodiments of the present invention.

FIG. 7 illustrates an algorithm used by system 5 of FIG. 1 for implementing a process for presenting the audio/video data file of the multimedia file generated in the algorithm of FIG. 6, in accordance with embodiments of the present invention. In step 700, a computer processor (i.e., of a computing system such as, inter alia, computing system 10 of FIG. 1)

receives from a user accessing a device (e.g., a television, a cellular telephone, a PDA, etc) a command for enabling the audio/video data file. In step 704, the computer processor retrieves (from the device) a user profile associated with the user. Additionally or alternatively, the computer processor retrieves scenario based filtering data associated with filtering the audio/video data file. In step 708, the computer processor analyzes the user profile and/or the scenario based filtering data with respect to each tag received in step 619 of FIG. 6. In step 712, it is determined (based on results of the analysis of step 708) if the user is authorized receive any of the audio/video data file. If in step 712, it is determined that the user is not authorized receive any of the audio/video data file then in step 714, the computer processor transmits a message to the user indicating that the user is not authorized receive any of the audio/video data file. If in step 712, it is determined that the user is authorized receive some of the audio/video data file then in step 715, the computer processor determines (based on results of the analysis of step 708) if additional audio/video data portions/objects (i.e., in addition to the specified audio/video data portions removed in step 614 of the algorithm of FIG. 6) should be removed from the audio/video data file. If in step 715, the computer processor determines that additional audio/video data portions/objects (i.e., in addition to the specified audio/video data portions removed in step 614 of the algorithm of FIG. 6) should not be removed from the audio/video data file then in step 722, the audio/video data file (i.e., without the specified audio/video data portions removed in step 614 of the algorithm of FIG. 6) is presented to the user. If in step 715, the computer processor determines that additional audio/video data portions/objects (i.e., in addition to the specified audio/video data portions removed in step 614 of the algorithm of FIG. 6) should be removed from the audio/video data file then in step 719, the additional audio/video data portions/objects are removed from the audio/video data file. In step 722, the audio/video data file (i.e., without the specified audio/video data portions removed in step 614 of the algorithm of FIG. 6 and without the additional audio/video data portions/objects removed in step 719) is presented to the user.

Figure 8:
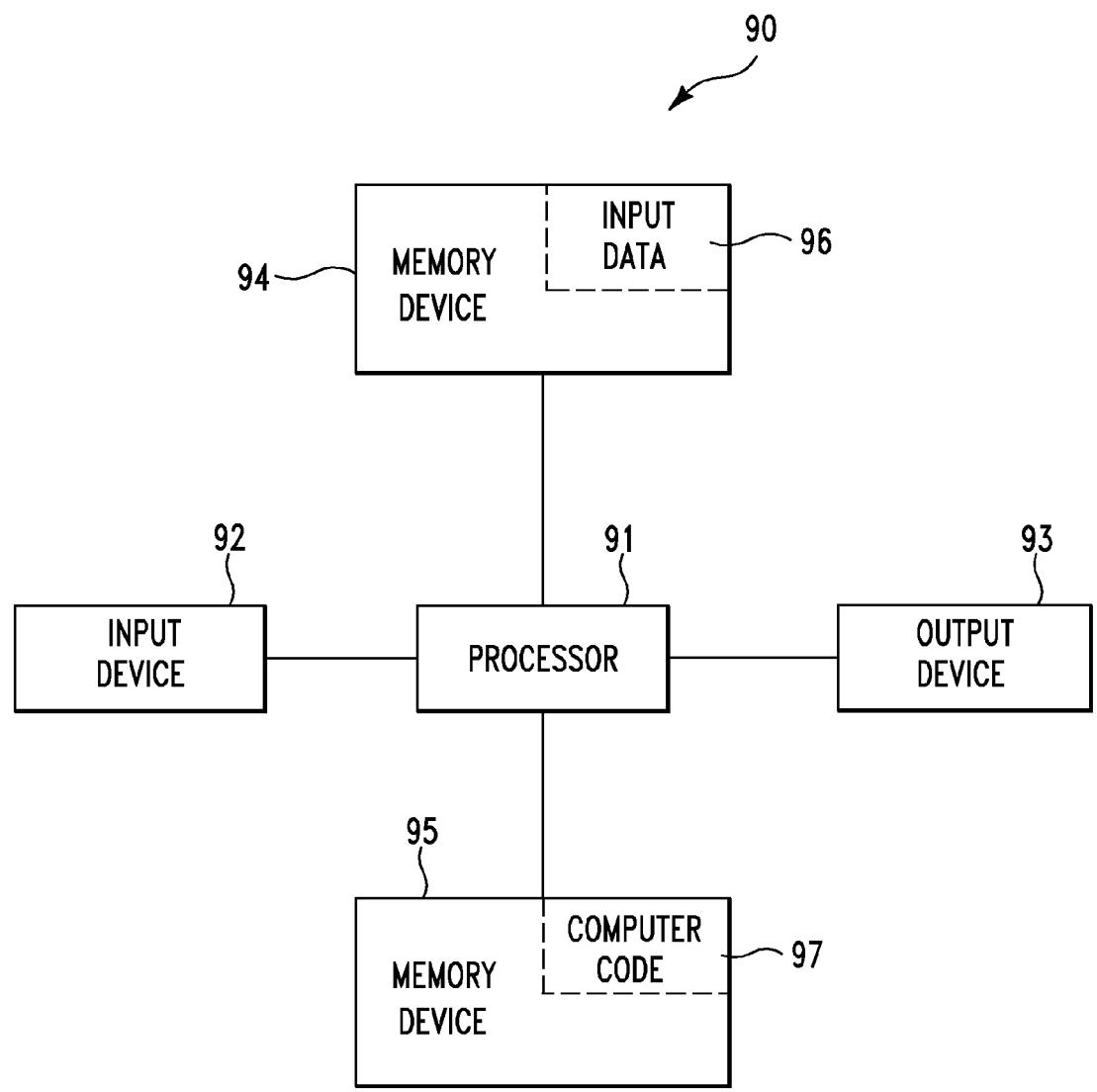
FIG. 8 illustrates a computer apparatus used for filtering audio/video objects from an audio/video frame, in accordance with embodiments of the present invention.

FIG. 8 illustrates a computer apparatus 90 (e.g., computing system 10 of FIG. 1) used for filtering audio/video objects from an audio/video frame, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 6 and 7) for filtering audio/video objects from an audio/video frame. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may comprise the algorithms of FIGS. 6 and 7 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to filter audio/video objects from an audio/video frame. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for filtering audio/video objects from an audio/video frame. In another embodiment, the invention provides a method that performs the process steps of the invention on a subscription, advertising, and/or fee basis. That is, a service provider, such as a Solution Integrator, could offer to filter audio/video objects from an audio/video frame. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

receiving, by a computer processor of a computing system, filtering data associated with filtering an audio/video data file comprising audio voice data, audio music data, title data, and video data;

first analyzing, by said computer processor, said filtering data with respect to said audio/video data file;

determining, by said computer processor based on results of said first analyzing, specified audio/video data portions of said audio/video data file, wherein said specified audio/video data portions comprise data objects within frames of said audio/video data file;

retrieving, by said computer processor from said audio/video data file in response to said determining, said specified audio/video data portions from said audio/video data file;

removing, by said computer processor, gaps existing in said audio/video data file resulting from said retrieving said specified audio/video data portions;

receiving, by said computer processor, tags comprising instructions for presenting said video data of said audio/video data file, said audio voice data of said audio/video data file, said audio music data, said title data, and said specified audio/video data portions;

storing, by said computer processor, said video data of said audio/video data file in a first individual layer of a multimedia file, said audio voice data of said audio/video data file in a second individual layer of said multimedia file, said audio music data in a third individual layer of said multimedia file, said title data in a fourth individual layer of said multimedia file, and said specified audio/video data portions in additional individual layers of said multimedia file, wherein each of said first individual layer, said individual second layer, said third individual layer, said individual fourth layer, and said additional individual layers comprises a dedicated tag layer comprising associated tags of said tags; and presenting, by said computer processor, a graphical user interface (GUI) illustrating said video data in said first individual layer, said audio voice data of said audio/video data file in said second individual layer, said audio music data in said third individual layer, said title data in said fourth individual layer, said specified audio/video data portions in said additional individual layers, and each said dedicated tag layer comprising said associated tags, wherein GUI presents each said dedicated tag layer comprising an associated tag such that each said dedicated tag layer is presented adjacent to an associated layer of said first individual layer, said second individual layer, said third individual layer, said fourth individual layer, and each of said additional individual layers.

2. The method of claim 1, further comprising:
receiving, by said computer processor from a first user accessing a first device, a command for enabling said audio/video data file;
retrieving, by said computer processor from said first device, a first user profile associated with said first user;
second analyzing, by said computer processor, said first user profile with respect to each tag of said tags; and
transmitting, by said computer processor to said first user via said first device in response to said second analyzing, said video data, said audio voice data, and first audio/video data portions of said specified audio/video data portions, wherein said first audio/video data portions are associated with said first user profile, and wherein said first device presents said video data, said audio voice data, and said first audio/video data portions to said first user.

3. The method of claim 2, further comprising:
receiving, by said computer processor from a second user accessing a second device, a command for enabling said audio/video data file, said second user differing from said first user;
retrieving, by said computer processor from said second device, a second user profile associated with said second user, second user profile differing from said first user profile;
third analyzing, by said computer processor, said second user profile with respect to each tag of said tags; and
transmitting, by said computer processor to said second user profile user via said second device in response to results of said second analyzing, said video data, said audio voice data, and second audio/video data portions of said specified audio/video data portions, wherein said second audio/video data portions differ from said first audio/video data portions, wherein said second audio/video data portions are associated with said second user profile, and wherein said second device presents said video data, said audio voice data, and said second audio/video data portions to said second user.

4. The method of claim 1, further comprising:
receiving, by said computer processor from a first user accessing a first device, a command for enabling said audio/video data file;
retrieving, by said computer processor from said first device, a first user profile associated with said first user;
second analyzing, by said computer processor, said first user profile with respect to each tag of said tags; and
transmitting, by said computer processor to said first user via said first device in response to results of said second analyzing, a message indicating that said first user is not authorized to receive any of said multimedia files.

5. The method of claim 1, further comprising:
receiving, by said computer processor from a first user accessing a first device, a command for enabling said audio/video data file;
retrieving, by said computer processor from said first device, a first user profile associated with said first user;
second analyzing, by said computer processor, said first user profile with respect to each tag of said tags; and
transmitting, by said computer processor to said first user via said first device in response to results of said second analyzing first audio/video data portions of said specified audio/video data portions, wherein said first audio/video data portions are associated with said first user profile, and wherein said first device presents said first audio/video data portions to said first user.

6. The method of claim 1, wherein said first device comprises a device selected from the group consisting of an Internet enabled television, an Internet portal, and a wireless device.

7. The method of claim 1, wherein each audio/video data portion of said specified audio/video data portions comprises data selected from the group consisting of a video object within a video frame, audio speech data, and text data.

8. The method of claim 1, wherein said filtering data comprises rules associated with determining said specified audio/video data portions, and wherein said rules are selected from the group consisting of location based rules, age group based rules, organizational structure based rules, and confidential information based rules.

9. The method of claim 1, further comprising:
receiving, by said computer processor from a user, filtering criteria indicating additionally filtering said audio/video data file;
retrieving, by said computer processor from said audio/video data file in response to said filtering criteria, additionally specified audio/video data portions from said audio/video data file; and
removing, by said computer processor, gaps existing in said audio/video data file resulting from said retrieving said additionally specified audio/video data portions.

10. The method of claim 1, further comprising:
receiving, by said computer processor, scenario based filtering data associated with filtering said audio/video data file;
second analyzing, by said computer processor, said scenario based filtering data with respect to said audio/video data file;
determining, by said computer processor based on results of said second analyzing, second specified audio/video data portions of said audio/video data file;
receiving, by said computer processor from a first user accessing a first device, a command for enabling said audio/video data file;

determining, by said computer processor based on said scenario based filtering data, that said second specified audio/video data portions should be removed; and retrieving, by said computer processor from said audio/video data file, said second specified audio/video data portions from said audio/video data file.

11. The method of claim 1, further comprising:

providing at least one support service for at least one of creating, integrating, hosting, maintaining, and deploying computer-readable code in said computing system, wherein the code in combination with the computing system is capable of performing: said receiving said audio/video file, said receiving said filtering data, said first analyzing, said determining, said retrieving, said removing, said receiving said tags, said storing said video data, and said storing said multimedia file.

12. A computer program product, comprising a computer readable storage device storing a computer readable program code, said computer readable program code comprising an algorithm that when executed by a computer processor of a computing system implements a method comprising:

receiving, by said computer processor, filtering data associated with filtering an audio/video data file comprising audio voice data, audio music data, title data, and video data;

first analyzing, by said computer processor, said filtering data with respect to said audio/video data file;

determining, by said computer processor based on results of said first analyzing, specified audio/video data portions of said audio/video data file, wherein said specified audio/video data portions comprise data objects within frames of said audio/video data file;

retrieving, by said computer processor from said audio/video data file in response to said determining, said specified audio/video data portions from said audio/video data file;

removing, by said computer processor, gaps existing in said audio/video data file resulting from said retrieving said specified audio/video data portions;

receiving, by said computer processor, tags comprising instructions for presenting said video data of said audio/video data file, said audio voice data of said audio/video data file, said audio music data, said title data, and said specified audio/video data portions;

storing, by said computer processor, said video data of said audio/video data file in a first individual layer of a multimedia file, said audio voice data of said audio/video data file in a second individual layer of said multimedia file, said audio music data in a third individual layer of said multimedia file, said title data in a fourth individual layer of said multimedia file, and said specified audio/video data portions in additional individual layers of said multimedia file, wherein each of said first individual layer, said individual second layer, said third individual layer, said individual fourth layer, and said additional individual layers comprises a dedicated tag layer comprising associated tags of said tags; and presenting, by said computer processor, a graphical user interface (GUI) illustrating said video data in said first individual layer, said audio voice data of said audio/video data file in said second individual layer, said audio music data in said third individual layer, said title data in said fourth individual layer, said specified audio/video data portions in said additional individual layers, and each said dedicated tag layer comprising said associated tags, wherein GUI presents each said dedicated tag layer comprising an associated tag such that each said dedicated tag layer is presented adjacent to an associated layer of said first individual layer, said second individual layer, said third individual layer, said fourth individual layer, and each of said additional individual layers.

13. The computer program product of claim 12, wherein said method further comprises:

receiving, by said computer processor from a first user accessing a first device, a command for enabling said audio/video data file;

retrieving, by said computer processor from said first device, a first user profile associated with said first user;

second analyzing, by said computer processor, said first user profile with respect to each tag of said tags; and transmitting, by said computer processor to said first user via said first device in response to said second analyzing, said video data, said audio voice data, and first audio/video data portions of said specified audio/video data portions, wherein said first audio/video data portions are associated with said first user profile, and wherein said first device presents said video data, said audio voice data, and said first audio/video data portions to said first user.

14. The computer program product of claim 13, wherein said method further comprises:

receiving, by said computer processor from a second user accessing a second device, a command for enabling said audio/video data file, said second user differing from said first user;

retrieving, by said computer processor from said second device, a second user profile associated with said second user, second user profile differing from said first user profile;

third analyzing, by said computer processor, said second user profile with respect to each tag of said tags; and transmitting, by said computer processor to said second user profile user via said second device in response to results of said second analyzing, said video data, said audio voice data, and second audio/video data portions of said specified audio/video data portions, wherein said second audio/video data portions differ from said first audio/video data portions, wherein said second audio/video data portions are associated with said second user profile, and wherein said second device presents said video data, said audio voice data, and said second audio/video data portions to said second user.

15. The computer program product of claim 12, wherein said method further comprises:

receiving, by said computer processor from a first user accessing a first device, a command for enabling said audio/video data file;

retrieving, by said computer processor from said first device, a first user profile associated with said first user;

second analyzing, by said computer processor, said first user profile with respect to each tag of said tags; and transmitting, by said computer processor to said first user via said first device in response to results of said second analyzing, a message indicating that said first user is not authorized to receive any of said multimedia files.

16. The computer program product of claim 12, wherein said method further comprises:

receiving, by said computer processor from a first user accessing a first device, a command for enabling said audio/video data file;

retrieving, by said computer processor from said first device, a first user profile associated with said first user;

second analyzing, by said computer processor, said first user profile with respect to each tag of said tags; and transmitting, by said computer processor to said first user via said first device in response to results of said second analyzing first audio/video data portions of said specified audio/video data portions, wherein said first audio/video data portions are associated with said first user profile, and wherein said first device presents said first audio/video data portions to said first user.

17. The computer program product of claim 12, wherein said first device comprises a device selected from the group consisting of an Internet enabled television, an Internet portal, and a wireless device.

18. The computer program product of claim 12, wherein each audio/video data portion of said specified audio/video data portions comprises data selected from the group consisting of a video object within a video frame, audio speech data, and text data.

19. A computing system comprising a computer processor coupled to a computer-readable memory unit, said memory unit comprising instructions that when executed by the computer processor implements a method comprising:

receiving, by said computer processor, filtering data associated with filtering an audio/video data file comprising audio voice data, audio music data, title data, and video data;

first analyzing, by said computer processor, said filtering data with respect to said audio/video data file;

determining, by said computer processor based on results of said first analyzing, specified audio/video data portions of said audio/video data file, wherein said specified audio/video data portions comprise data objects within frames of said audio/video data file;

retrieving, by said computer processor from said audio/video data file in response to said determining, said specified audio/video data portions from said audio/video data file;

removing, by said computer processor, gaps existing in said audio/video data file resulting from said retrieving said specified audio/video data portions;

receiving, by said computer processor, tags comprising instructions for presenting said video data of said audio/video data file, said audio voice data of said audio/video data file, said audio music data, said title data, and said specified audio/video data portions;

storing, by said computer processor, said video data of said audio/video data file in a first individual layer of a multimedia file, said audio voice data of said audio/video data file in a second individual layer of said multimedia file, said audio music data in a third individual layer of said multimedia file, said title data in a fourth individual layer of said multimedia file, and said specified audio/video data portions in additional individual layers of said multimedia file, wherein each of said first individual layer, said individual second layer, said third individual layer, said individual fourth layer, and said additional individual layers comprises a dedicated tag layer comprising associated tags of said tags; and presenting, by said computer processor, a graphical user interface (GUI) illustrating said video data in said first individual layer, said audio voice data of said audio/video data file in said second individual layer, said audio music data in said third individual layer, said title data in said fourth individual layer, said specified audio/video data portions in said additional individual layers, and each said dedicated tag layer comprising said associated tags, wherein GUI presents each said dedicated tag layer comprising an associated tag such that each said dedicated tag layer is presented adjacent to an associated layer of said first individual layer, said second individual layer, said third individual layer, said fourth individual layer, and each of said additional individual layers.

20. The computing system of claim 19, wherein said method further comprises:

receiving, by said computer processor from a first user accessing a first device, a command for enabling said audio/video data file;

retrieving, by said computer processor from said first device, a first user profile associated with said first user;

second analyzing, by said computer processor, said first user profile with respect to each tag of said tags; and transmitting, by said computer processor to said first user via said first device in response to said second analyzing, said video data, said audio voice data, and first audio/video data portions of said specified audio/video data portions, wherein said first audio/video data portions are associated with said first user profile, and wherein said first device presents said video data, said audio voice data, and said first audio/video data portions to said first user.

* * * * *